United States Patent
Anderson

(10) Patent No.: US 6,724,400 B1
(45) Date of Patent: Apr. 20, 2004

(54) HUMAN-COMPUTER INTERFACE INCORPORATING PERSONAL AND APPLICATION DOMAINS

(75) Inventor: Thomas G. Anderson, Albuquerque, NM (US)

(73) Assignee: Novint Technologies, Inc., Albuquerque, NM (US)

( * ) Notice: Subject to any disclaimer, the term of this patent is extended or adjusted under 35 U.S.C. 154(b) by 665 days.

(21) Appl. No.: 09/649,853

(22) Filed: Aug. 29, 2000

Related U.S. Application Data

(60) Provisional application No. 60/202,448, filed on May 6, 2000.

(51) Int. Cl.$^7$ .................................................. G09G 5/00
(52) U.S. Cl. ...................... 345/764; 345/762; 345/765; 345/802; 345/848; 345/850; 345/854
(58) Field of Search ................................ 345/744, 762, 345/764, 854, 733, 765, 778, 766, 848, 790, 850, 802; 709/328

(56) References Cited

U.S. PATENT DOCUMENTS

| | | | |
|---|---|---|---|
| 5,296,871 A | | 3/1994 | Paley |
| 5,459,382 A | | 10/1995 | Jacobus et al. |
| 5,506,605 A | | 4/1996 | Paley |
| 5,576,727 A | | 11/1996 | Rosenberg et al. |
| 5,588,105 A | * | 12/1996 | Foster et al. ................. 345/779 |

(List continued on next page.)

OTHER PUBLICATIONS http://www.novint.com/links/publications/publications/html, Novint technologies publications link.
http://haptic.mech.northwestern.edu/library, Haptics community Web page.
http://www.cim.mcgill.ca/~haptic/publications.html, Selected publications.
wsiwyg://main.15/http://marg.www . . . ple/marg/haptics-bibliography.html, Haptics bibliography.
http://www.hitl.washington.edu/publications, hit lab publications.
http://www.caip.rutgers.edu/vrlab/pu–b.html, Human–Machine Interface Lab.
http://www.haptics–e.org, Haptics–e, The Electronic Journal Of Haptics Research.
http://intron.kz.tsukuba.as.jp/LHX/icat97.html, A versatile software platform for visual/haptic environment, Hashimoto et al.
http://www.novint.com/links/links.html.
http://www.novint.com/links/products/products.html.
MUSE (Multidimensional, User–oriented Synthetic Environment), International Journal of Virtual Reality, vol. 1, No. 1, winter 1995.

*Primary Examiner*—Raymond J. Bayerl
*Assistant Examiner*—Cuong T. Thai
(74) *Attorney, Agent, or Firm*—V. Gerald Grafe

(57) ABSTRACT

The present invention provides a human-computer interface. The interface includes provision of an application domain, for example corresponding to a three-dimensional application. The user is allowed to navigate and interact with the application domain. The interface also includes a personal domain, offering the user controls and interaction distinct from the application domain. The separation into two domains allows the most suitable interface methods in each: for example, three-dimensional navigation in the application domain, and two- or three-dimensional controls in the personal domain. Transitions between the application domain and the personal domain are under control of the user, and the transition method is substantially independent of the navigation in the application domain. For example, the user can fly through a three-dimensional application domain, and always move to the personal domain by moving a cursor near one extreme of the display.

31 Claims, 8 Drawing Sheets

U.S. PATENT DOCUMENTS

| | | |
|---|---|---|
| 5,629,594 A | 5/1997 | Jacobus et al. |
| 5,734,373 A | 3/1998 | Rosenberg et al. |
| 5,739,811 A | 4/1998 | Rosenberg et al. |
| 5,825,308 A | 10/1998 | Rosenberg et al. |
| 5,831,408 A | 11/1998 | Jacobus et al. |
| 5,844,392 A | 12/1998 | Peurach et al. |
| 5,889,670 A | 3/1999 | Schuler et al. |
| 5,956,484 A | 9/1999 | Rosenberg et al. |
| 5,983,220 A * | 11/1999 | Schmitt .......................... 707/5 |
| 6,028,593 A | 2/2000 | Rosenberg et al. |
| 6,101,530 A | 8/2000 | Rosenberg et al. |
| 6,125,385 A | 9/2000 | Wies et al. |
| 6,131,097 A | 10/2000 | Peurach et al. |
| 6,166,732 A * | 12/2000 | Mitchell et al. ............. 345/733 |
| 6,219,032 B1 * | 4/2001 | Rosenberg et al. ......... 345/157 |
| 6,463,431 B1 * | 10/2002 | Schmitt .......................... 707/5 |
| 6,463,534 B1 * | 10/2002 | Geiger et al. ................ 713/168 |
| 6,509,912 B1 * | 1/2003 | Moran et al. ................ 345/762 |
| 6,570,587 B1 * | 5/2003 | Efrat et al. .................. 345/723 |

* cited by examiner

HUMAN-COMPUTER INTERFACE INCORPORATING PERSONAL AND APPLICATION DOMAINS

PRIORITY CLAIM

This application claims the benefit of U.S. Provisional Application No. 60/202,448, filed on May 6, 2000, incorporated herein by reference.

This invention was made with Government support under Contract DE-AC04-94AL85000 awarded by the U. S. Department of Energy. The Government has certain rights in the invention.

BACKGROUND OF THE INVENTION

This invention relates to the field of human-computer interfaces, specifically those relating to haptics, multidimensional displays and navigation; interaction with multidimensional environments and objects, and methods of intuitively interfacing therewith.

Computing technology has seen a many-fold increase in capability in recent years. Processors work at ever higher rates; memories are ever larger and always faster; mass storage is larger and cheaper every year. Computers now are essential elements in many aspects of life, and are often used to present three dimensional worlds to users, in everything from games to scientific visualization.

The interface between the user and the computer has not seen the same rate of change. Screen windows, keyboard, monitor, and mouse are the standard, and have seen little change since their introduction. Many computers are purchased with great study as to processor speed, memory size, and disk space. Often, little thought is given to the human-computer interface, although most of the user's experience with the computer will be dominated by the interface (rarely does a user spend significant time waiting for a computer to calculate, while every interaction must use the human-computer interface).

As computers continue to increase in capability, the human-computer interface will become increasingly important. The effective bandwidth of communication with the user will not be sufficient using only the traditional mouse and keyboard for input and monitor and speakers for output. More capable interface support will be desired to accommodate more complex and demanding applications. For example, six degree of freedom input devices, force and tactile feedback devices, three dimensional sound, and stereo or holographic displays can improve the human-computer interface.

As these new interface capabilities become available, new interface methods are needed to fully utilize the new modes of human-computer communication enabled. Preferably, such new methods can build on interface methods learned by users in real-world situations and in two-dimensional computer interfaces. Specifically, users have become accustomed to two-dimensional computer interfaces, with control panels, menus, and buttons. Users are also accustomed to three-dimensional interfaces in real-world situations, visual and tactile depth perception aid in finding and manipulating such controls. For example, the controls of a car radio are always in some understandable relationship to the usual position of the driver. Such simplistic relationship can be undesirable in a three-dimensional computer environment, however, where the user can desire that controls be available during three-dimensional navigation free of the requirement of experiencing the environment through a windshield.

Fuller realization of the entertainment and productivity benefits possible from computer technology requires more improved interfaces. Accordingly, there is a need for improved human-computer interfaces that offer more intuitive navigation and control of the computer.

SUMMARY OF THE INVENTION

The present invention provides a human-computer interface. The interface includes provision of an application domain, for example corresponding to a three-dimensional application. The user is allowed to navigate and interact with the application domain. The interface also includes a personal domain, offering the user controls and interaction distinct from the application domain. The separation into two domains allows the most suitable interface methods in each: for example, three-dimensional navigation in the application domain, and two- or three-dimensional controls in the personal domain. Transitions between the application domain and the personal domain are under control of the user, and the transition method is substantially independent of the navigation in the application domain. For example, the user can fly through a three-dimensional application domain, and always move to the personal domain by moving a cursor near one extreme of the display.

The arrangement of domains, the method of controlling transitions between domains, and the method of communicating when a transition occurs can all have significant effect on the overall effectiveness of the human-computer interface. Accordingly, the present invention comprises various arrangements of personal domains and application domains, corresponding to various desirable human-computer interface characteristics. The present invention further comprises various techniques for allowing a user to control transition between domains, and for communicating to the user when a transition occurs.

Advantages and novel features will become apparent to those skilled in the art upon examination of the following description or may be learned by practice of the invention. The objects and advantages of the invention may be realized and attained by means of the instrumentalities and combinations particularly pointed out in the appended claims.

DESCRIPTION OF THE FIGURES

The accompanying drawings, which are incorporated into and form part of the specification, illustrate embodiments of the invention and, together with the description, serve to explain the pncipsles of the invention.

DETAILED DESCRIPTION OF THE INVENTION

Figure 1:
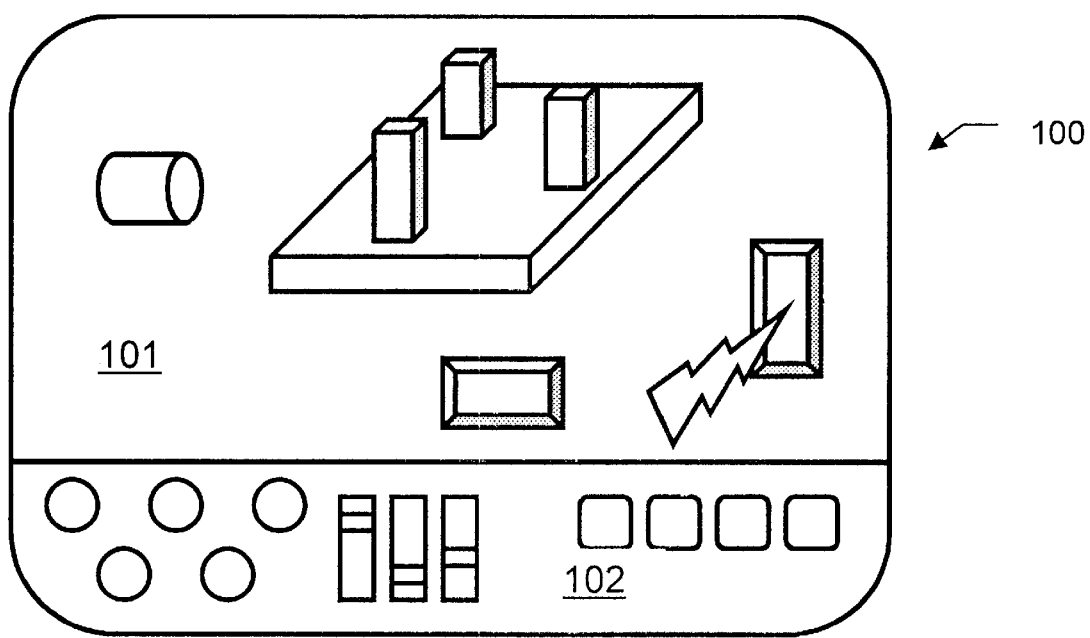
FIG. 1 is an illustration of a computer display representing an application domain and a personal domain.

The present invention provides a human-computer interface. The interface includes provision of two distinct domains, and detection of transitions between the two. The interface provides an application domain, for example corresponding to a three-dimensional application. The user is allowed to navigate and interact with the application when the application domain is active. The interface also provides a personal domain, offering the user controls and interaction distinct from the application domain. The separation into two domains allows the most suitable interface methods in each: for example, navigation in the application domain, and controls in the personal domain. Transitions between the application domain and the personal domain are under control of the user, and the transition method can be substantially independent of the navigation in the application domain. For example, the user can fly through a three-dimensional application domain, and always move to the personal domain by moving a cursor near one extreme of the display or one extreme of the application domain.

The arrangement of domains, the method of controlling transitions between domains, and the method of communicating when a transition occurs can all have significant effect on the overall effectiveness of the human-computer interface. Accordingly, the present invention comprises various arrangements of personal domains and application domains, corresponding to various desirable human-computer interface characteristics. The present invention further comprises various techniques for allowing a user to control transition between domains, and for communicating to the user when a transition occurs.

The Applicaiton Domain

The application domain corresponds to an application, and provides interaction with the user according to the interface characteristics appropriate to the application. For example, if the application includes a space navigable in three dimensions, the application domain can provide display of the three-dimensional space, and interaction comprising navigation in three dimensions. Interaction in the application domain includes detection of user input to designate the personal domain as the active domain. Active domain transitions are discussed below. Designation of the personal domain as the active domain can be independent of control of the application so that the user always has an intuitive path back to the personal domain. Reliance on ready and consistent access to the personal domain can improve the effectiveness of the human-computer interface. Designation of the personal domain as the active domain can be in a consistent tnanner across multiple applications, allowing a user to rely on the availability and interface characteristics if the personal domain instead of learning new interface characteristics for each application. Further, the interaction in the application domain can be consistent across multiple applications, allowing a user to work with multiple applications without requiring adaptation to different application interfaces.

The Personal Domain

The personal domain corresponds to a personal interaction environment, and can include interaction with characteristics of the application and interaction external to the application. For example, the personal domain can include controls over aspects of the application, including navigation in a three-dimensional application space. It can also include interaction such as communications (e.g., mail, inter-computer communications) and data operations (e.g., printing, file organization and operations). The interaction environment of the personal domain can be distinct from the application domain, since the personal domain can focus on personal interaction needs rather than interaction required by the application. The interaction environment of the personal domain can also be substantially consistent across many application domains, allowing the user to learn a single interface paradigm useful in many applications.

The personal domain includes detection of the user designating the application domain as the active domain. Transitions from the personal domain to the application domain can be different from transitions from the application domain to the personal domain, without confusion to the user since the interaction environments are distinct. The personal domain can also include detection of transitions to other personal domains, and to multiple application domains. A user can transition from an application domain to a personal domain. While in the personal domain, the user can interact with the computer according to a familiar personal interaction environment. The user can transition from the personal domain back to the application domain, or to other personal domains tailored to specific interaction needs (e.g., interactions related to computer communications can be grouped in a single personal domain). The user can also transition from the personal domain to other application domains.

Transitions Between Domains

Provision of natural, intuitive transitions between active domains can be important to the overall effectiveness of the human-computer interface. Each transition preferably is accessible to the user via intuitive controls, for example with computer metaphors of physical world interactions. Each transition can also include feedback to the user so that the user is always certain which domain is active.

Control of a cursor in multidimensional spaces can provide intuitive transition controls. An active domain can include a boundary between it and another domain. The user can effect a transition to the other domain by causing the cursor to traverse the boundary. Once in the new domain, the boundary might be reset to correspond to the interaction environment of the new domain. The boundary can be visible, such as a line or region shown on the display. For example, the application domain can use the majority of a display for application purposes, and reserve a portion at the bottom of the display for a boundary to a personal domain. Moving the cursor into that lower portion causes a transition to the personal domain. The personal domain can now use the entire display for personal domain interaction, and can use a different portion of the display, or a different transition control, to indicate transition back to the application domain. Further, the correspondence of input device with computer interaction can be different in different domains. For example, a three-dimensional interface device can be active in the application domain and a two dimensional device in the personal domain. As another example, the cursor motion, speed, and resulting navigation can be in different relation to the input device in different domains.

The boundary can also be invisible, such as by corresponding to a consistent portion of the domain or a consistent motion of a cursor control input device. For example, moving a cursor off the bottom edge of a display in the application domain can cause a transition to a personal domain. As another example, if the cursor is controllable in three dimensions, moving the cursor toward the user can cause a transition to a personal domain (i.e., the user "pulls out" of the application domain). The transition can also be relative to the motion of an input device. For example, moving a cursor control device to an extreme of its range of motion can cause a transition between domains (e.g., the user can get to the personal domain by moving the input device all the way back, or by making a specific set of motions with the input device).

The occurrence of a transition between domains can be communicated to the user. The characteristics of the display presented to the user can be distinct among the different domains. The display of the new domain can displace that of the former domain in a perceptible manner, for example by sliding in front of the former display, pushing the former display off, or rotating the former display out of view. The imminence of a transition can also be communicated to the user by providing force feedback to a user input device. The force feedback, for example, can be a click (as though the user dragged a pen across a crack in a surface) or a bump (as though the user was moving between physical spaces with a raised boundary).

The imminence of a transition can also be communicated to the user, and unplanned transitions avoided, by applying a force resisting the motion that would cause a transition. For example, if boundary traversal causes a transition, a force substantially opposing motion toward the boundary can be applied to a user input device. The occurrence of such a transition can be communicated by reducing the resistive force when the domain transition occurs, providing the user with haptic feedback of a sensation of popping through a barrier between domains.

Example of Interfacing with a personal Domain and an Application Domain

FIG. 1 is an illustration of a computer display representing an application domain and a personal domain. The application domain is represented to the user as an application portion 101 of the display 100. The personal domain is represented to the user as a personal portion 102 of the display 100. The user controls which domain is currently active, and interfaces with the computer according to the interface characteristics of the currently active domain. For example, the user can control the position of a cursor, and designate the active domain by moving the cursor to the portion of the display corresponding to the domain desired to be the active domain.

Moving the cursor to a defined region of the application portion of the display (in the figure moving the cursor to the bottom of the application portion) can switch the active domain to be the personal domain. While in the personal domain, the user can be presented with an interface having characteristics distinct from those of the application domain. For example, the personal domain can offer interface characteristics applicable to a wide variety of applications, providing the user a consistent and intuitive way to access a consistent set of system interface tools. The personal domain can offer interface tools affecting the application domain, and can offer interface tools affecting other than the application domain. For example, the personal domain can offer tools affecting the scale or content of the application domain, and can also offer tools allowing communication with other applications, other users, or other features of the computer.

Moving the cursor to a defined region of the personal portion (the top in the figure) can switch the active domain to be the application domain. The relationship between the application domain and the personal domain can be substantially independent of interaction in the application domain, allowing the user a consistent and intuitive way to access the personal domain. For example, the user can navigate a three-dimensional application domain with few restrictions, flying, teleporting, zooming in or out, moving objects, etc. At all times in the application domain, the controls of the personal domain are accessible in the same manner, providing easy access to the interface characteristics of the personal domain.

The user can control transitions by movement of a cursor (visible or invisible). An input device can also have its range of motion mapped such that a transition between domains is indicated by moving the device to a defined region of the range of motion. For example, a joystick as an input device can have the extreme back portion of its range of motion correspond to a transition to the personal domain, and the extreme forward portion of its range of motion correspond to a transition to the application domain. The transition definition can be dependent on which domain is currently active.

The interface can also provide feedback to allow the user to manage transitions across the boundary between the application domain and the personal domain. A force fed back to an appropriate input device, directed substantially away from the boundary, can provide the user a haptic indication of the boundary. The force can decrease perceptibly as the transition occurs, providing the user a sensation of pushing through a boundary and entering the newly active domain. The haptic feedback can allow effective designation of the active domain without requiring careful visual management of the cursor by the user, and can help prevent inadvertent active domain transitions.

Example of Changing Display as the Active Domain Changes

Figure 2A:
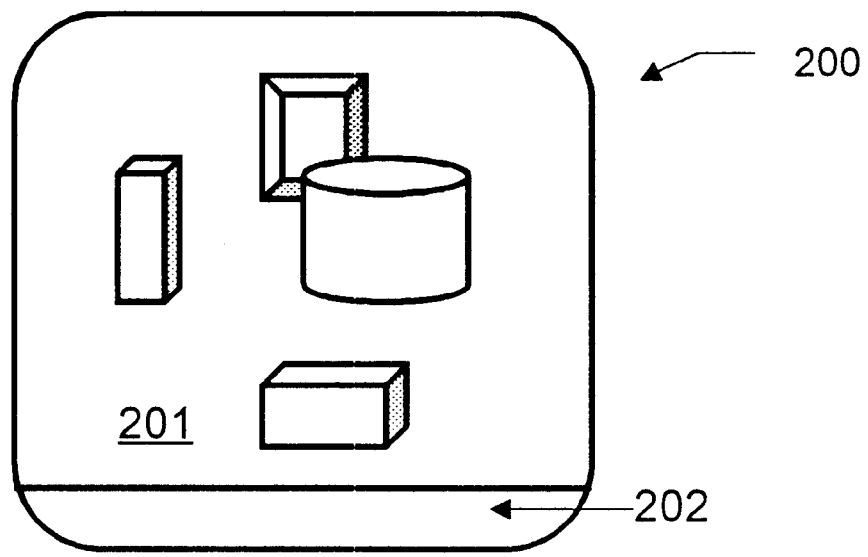
FIGS. 2(a,b) is an illustration of a computer display representing an application domain and a personal domain, showing the display when each domain is the active domain.
Figure 2B:
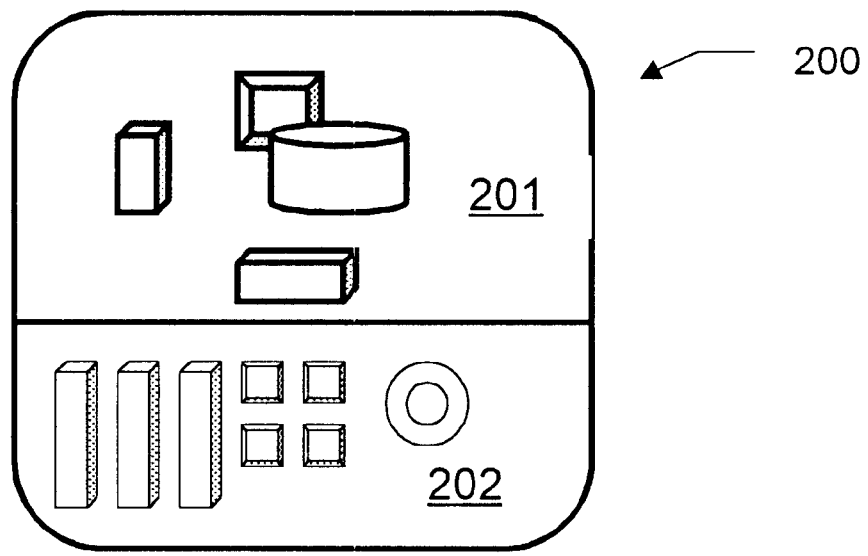

FIGS. 2(*a,b*) is an illustration of a computer display. In FIG. 2*a* the application domain is the active domain. Most of the display 200 is devoted to the application portion 201; the user can be effectively immersed in the application. The user can still, however, access the personal domain in an intuitive and consistent manner. The personal domain is represented in FIG. 2*a* as a small portion 202 of the display; it can be invisible as long as the user can reach it in an intuitive manner. The user can switch the active domain to be the personal domain by moving the cursor toward the bottom of the application portion of the display, whether into the small portion as shown in FIG. 2*a* or to the bottom if the personal portion is not visible. FIG. 2*b* shows the display changed as the personal domain becomes the active domain. The application portion 202 consumes a larger portion of the display 200. The user can interact with the personal domain and make use of the larger portion of the display now available for the personal domain.

Example of Three-dimensional Display Change as the Active Domain Changes

Figure 3A:
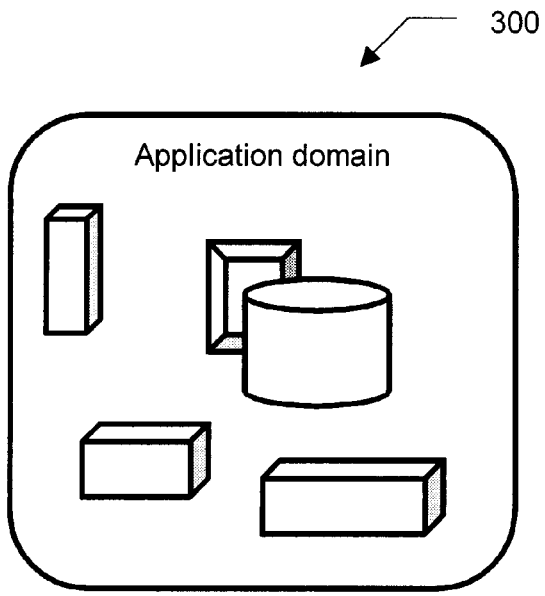
FIGS. 3(a,b,c) is an illustration of a computer display representing an application domain and a personal domain, showing the display when each domain is the active domain and showing a transition from the application domain as the active domain to the personal domain as the active domain.
Figure 3B:
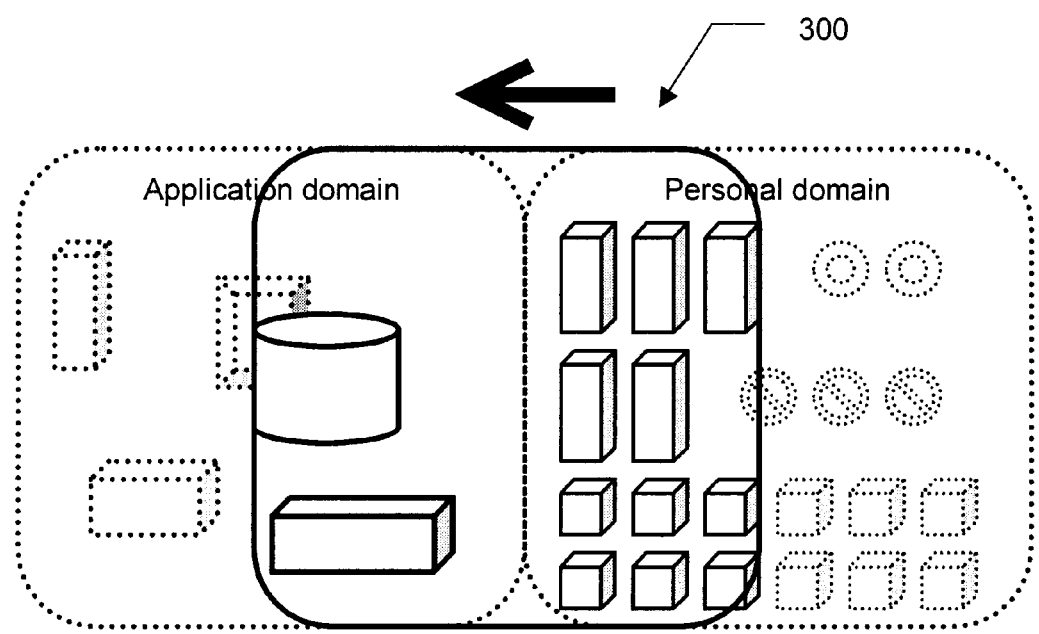
Figure 3C:
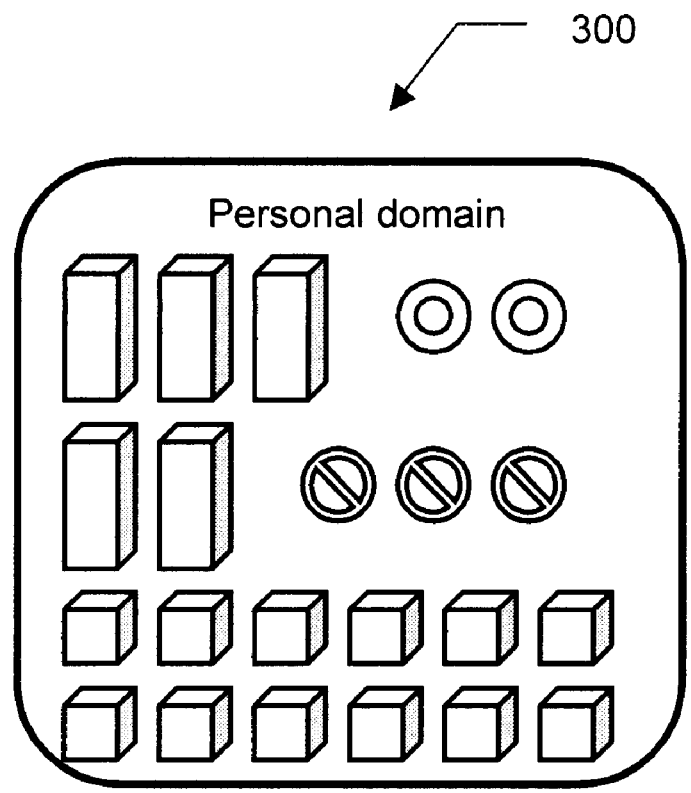
Figure 4A:
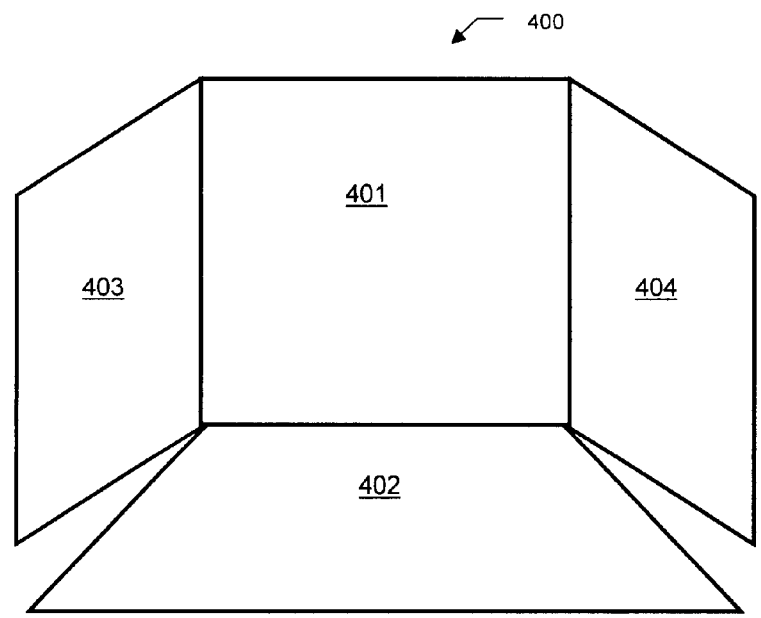
FIGS. 4(a,b,c,d) is an illustration of a computer display representing an application domain and a plurality of personal domains, showing the display when each domain is the active domain.
Figure 4B:
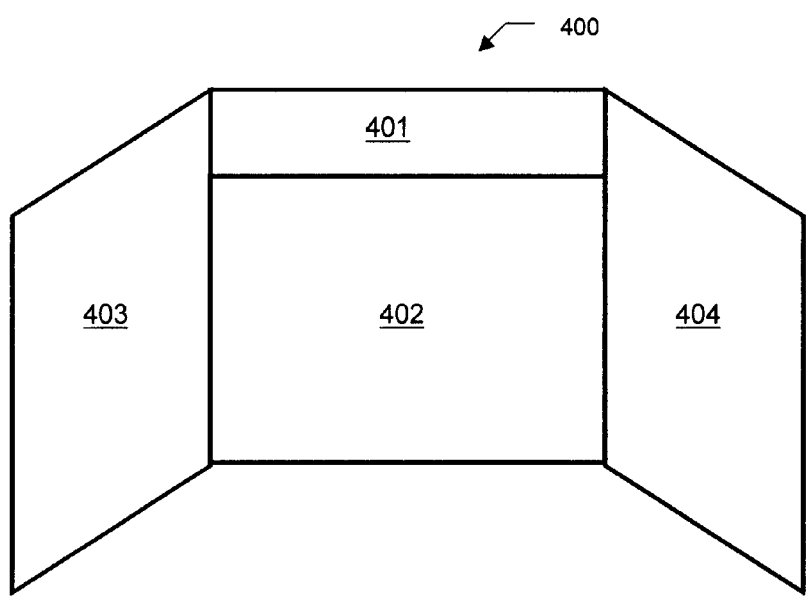
Figure 4C:
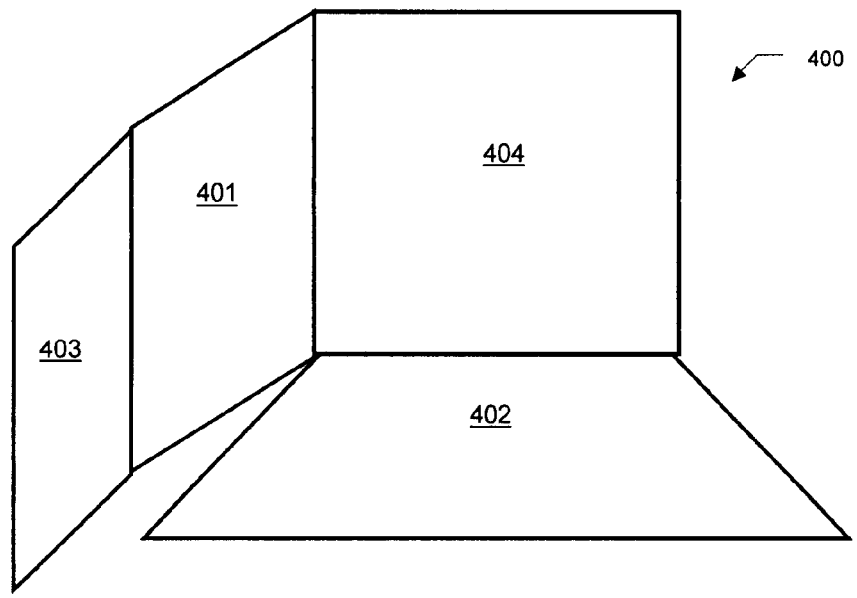
Figure 4D:
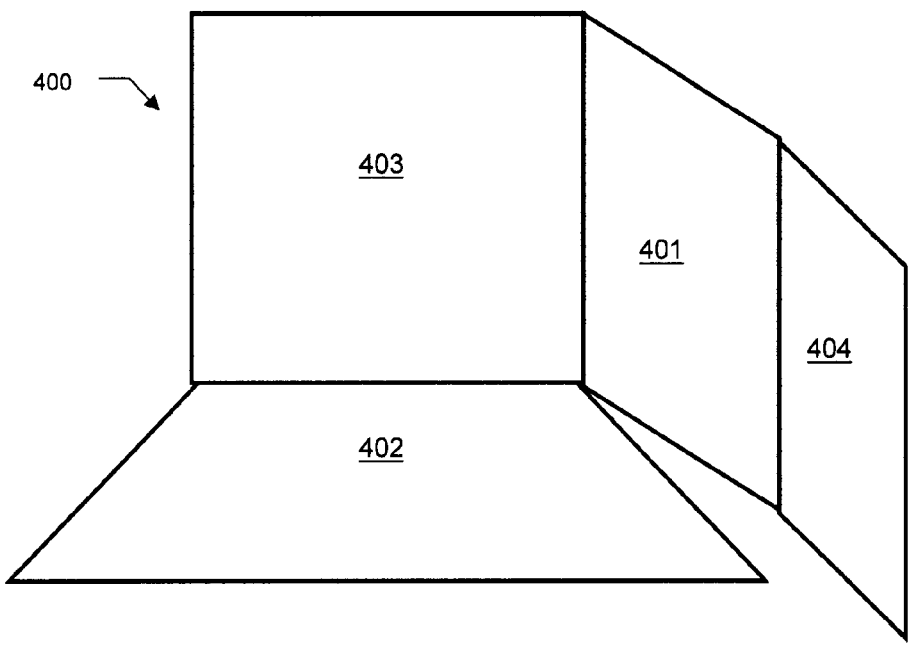

FIGS. 3(*a,b,c*) is an illustration of a computer display with the active domain the application domain (FIG. 3*a*), the personal domain (FIG. 3*c*), and a transition between the two (FIG. 3*b*). In FIG. 3*a*, the application domain is the active domain. The entire display 300 can be used for the application, and the user can be immersed in the interface characteristics of the application. Moving the cursor to a defined region of the display, the right edge in the figure, indicates a transition to the personal domain as the active domain. FIG. 3b shows the display change as the interface accommodates the transition from the application domain to the personal domain. The display reflects an animation of the application domain moving off the display and the personal domain moving into its place. The figure shows the transition as an illusion of the user turning the head from looking at the application domain to the side where the personal domain resides. Making the transition from the application domain to the personal domain substantially independent of navigation and control in the application domain provide the user an interface that allows interaction with the application while keeping the interface of the personal domain always accessible just by "looking" to the side (moving the cursor to the right). The user can move back to the application domain by simply moving back to the left of the personal domain display.

Example of Multiple Personal Domains, with Three-dimensional Interface Experience FIGS. 4(a,b,c,d) is an illustration of a computer display associated with an application domain 401 and three personal domains 402 304, 404. The application domain 401 occupies the majority of the display 400 when the application domain is the active domain. The interface provides the user with three personal domains, one 402 below the application domain and one at either side 403, 404 of the application domain (shown virtually in the figure extending from the display). The personal domains 403, 404 at the sides can be accessible via the sides of the application domain 401, the sides of the lower personal domain 402, or both, depending on the interface experience desired. The user can interact with the application domain 401 while it is active, and always have access to interface tools in the three personal domains 402, 403, 404 by merely causing transition to one of them as active. For example, the user can interact with objects in a three-dimensional sculpting application. Moving the cursor to the left (FIG. 4d) can provide the user access to that personal domain 403, perhaps providing access to interface tools that customize the characteristics of the sculpting application. Moving the cursor to the right when in that personal domain 403 moves the user back to the application domain 401. Moving the cursor to the bottom (FIG. 4b) of the application domain 401 causes that personal domain 402 to become active, perhaps providing access to other applications or other users. Moving the cursor back up returns the user to the application domain 401. Moving the cursor to the right (FIG. 4c) provides access to that personal domain 404, perhaps providing access to computer system tools (e.g., printers and file systems).

Example of Personal Domain Independent of Applicaiton DOMAINS

The interface can provide the user with personal domain interface characteristics consistent across diverse applications. Each application can have its own interface characteristics, as dictated by the needs of the application. Diverse applications, however, can provide similar methods for transitioning to the personal domain. Once in the personal domain, the user can be presented with familiar interface characteristics.

Figure 5:
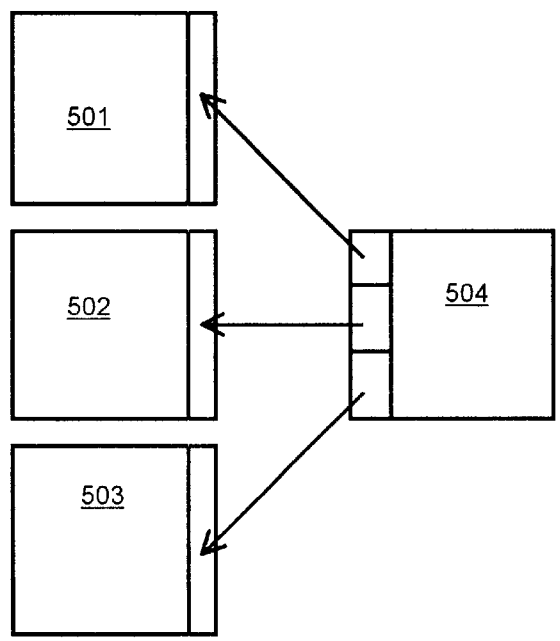
FIG. 5 is an illustration of the correspondence of one personal domain with three application domains.

FIG. 5 is an illustration of a single personal domain offering transitions to multiple (three in the figure) application domains. Each application 501, 502, 503 transitions to the personal domain 504 by moving the cursor to the right edge of the display. Once in the personal domain 504, the user can interact according to the personal domain interface characteristics. The personal domain provides transitions to three different application domains 501, 502, 503; the user transitions to one by moving the cursor to that region of the personal domain.

Figure 6:
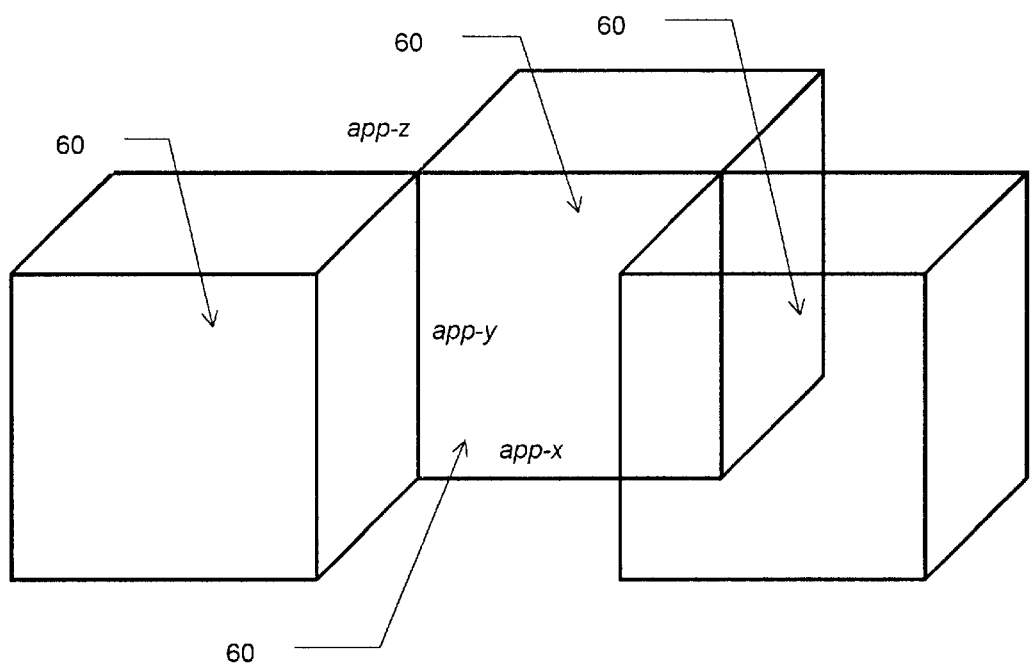
FIG. 6 is an illustration of a three-dimensional application domain and three personal domains.

Example of Personal Domains in Connection with a Three-dimensional Navigable Space FIG. 6 is an illustration of three personal domains 602, 603, 604 and an application domain 601. Application domain 601 corresponds to an application space navigable in three dimensions: app-x, app-y, and app-z. When the application domain is the active domain, the user can navigate therein, using almost the full range of the three dimensional space or three dimensional input device. Moving a cursor to a portion of the application space nearest the user (or smallest range of app-z), for example by moving the cursor in the app-z direction or by moving the input device toward the corresponding extreme of its range of motion, can cause a transition to the first personal domain 602 as the active domain. A resistive force can be applied as the cursor nears the transition region to provide more positive user control of the transition, and then reduced when the transition occurs to provide more positive communication of the transition.

When the first personal domain 602 is the active domain, the user can be presented with an interaction environment corresponding to the first personal domain. The interaction environment can comprise two dimensions, corresponding to just the plane of the boundary in the figure. Alternatively, the interaction environment can comprise three dimensions, for example comprising three dimensional buttons or controls and three-dimensional haptic feedback. Transitions to other domains can be similar to as discussed for the application to first personal domain transition, except that the first personal domain provides access to two other personal domains as well as back to the application domain. Moving to the far portion of the first personal domain can cause a transition back to the application domain, optionally including force feedback as discussed before. Moving to the far left of the first personal domain can cause a transition to the second personal domain. Moving to the far right of the first personal domain can cause a transition to the third personal domain. Once in the second or third personal domains, the user can again use almost the full range of the three dimensional space for interaction in the domain (similar to the discussion for the first personal space). Moving back across the corresponding edge can cause a transition back to the first personal domain.

Other mappings of domains and domain boundaries can be used, including boundaries beyond those possible with conventional three dimensional spaces. For example, the second and third personal domains in FIG. 6 can be directly linked via a domain boundary at their lower edges, not possible with a physical three dimensions. The mapping shown in FIG. 6 does, however, present the user with an intuitive, physical world sensation: the personal domains are intuitively in front of the application domain, and once in the first personal domain the second and third domains are at the user's sides. Force feedback can enhance the physical world sensation: the user can interact in the application domain, then pop through the front wall into the personal domain, interact there, then pop back into the application domain or the other personal domains.

Example Implementation

Figure 7:
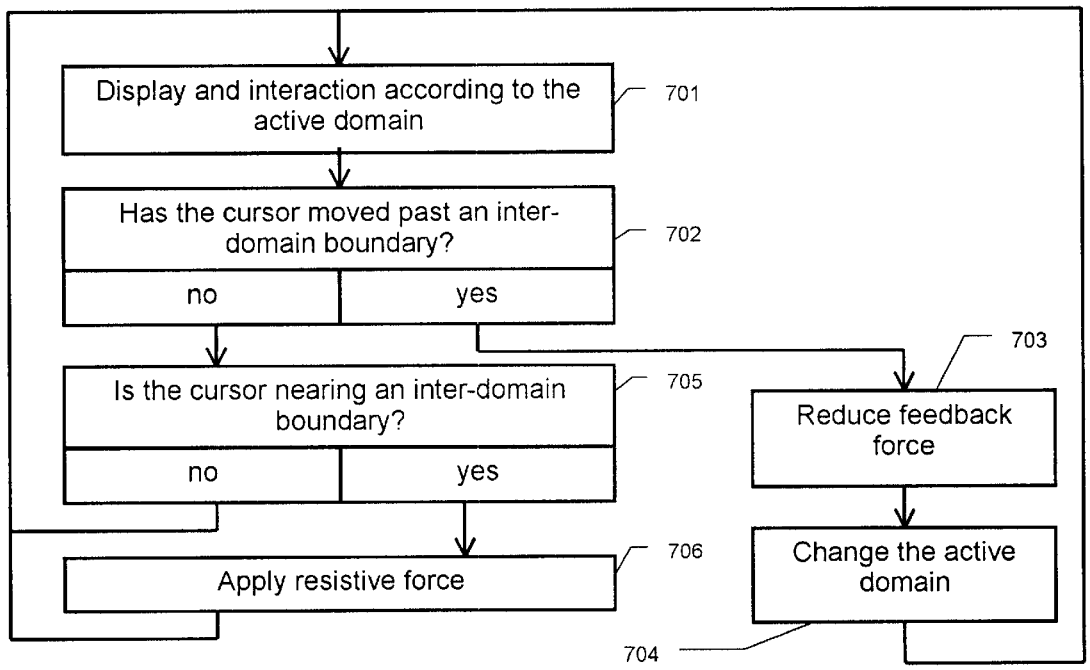
FIG. 7 is a flow diagram of an example implementation of the present invention.

A human-computer interface incorporating the present invention can be implemented with computer programming tools and techniques known to those skilled in the art. As an example, FIG. 7 is a flow diagram of one suitable implementation, accommodating multiple domains, with cursor/boundary transitions between domains, and with force feedback near the boundaries.

The interface comprises display and interaction according to the active domain 701. As discussed above, the display and interaction can be distinct between domains. The user input is monitored to detect when the cursor exceeds a boundary between the present active domain and another domain 702. If it has, then any force feedback relevant to the boundary is reduced 703, the active domain changed to the new domain 704, and the display and interaction replaced with those corresponding to the newly active domain 701. If it has not, then a determination is made whether the cursor is nearing an inter-domain boundary 705. If it is, then an appropriate feedback force is applied 706. Since the cursor is not past the boundary, the display and interaction are still according to the presently active domain 701.

Figure 8:
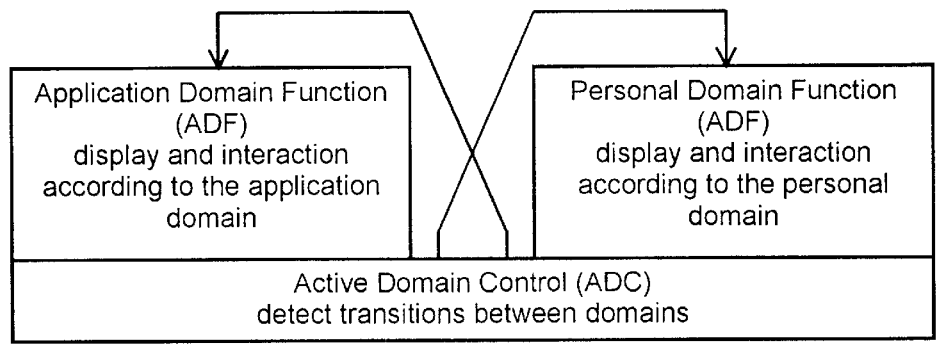
FIG. 8 is a schematic diagram of an example implementation of the present invention.

Another illustration of an implementation of the present invention is shown in FIG. 8. An application domain function ADF effects a display and interaction according to the application domain. An active domain controller ADC monitors for transitions indicated by the user to other domains, for example by cursor motion. When the ADC detects such a transition, control is transferred to the other domain, in the figure to personal domain function PDF. The PDF communicates the transition to the user, for example by reducing force feedback and by moving the display of the personal domain in place of the display of the application domain. The PDF then provides display and interface according to the personal domain. The ADC still monitors for transitions indicated by the user to other domains, for example by cursor motion. When the ADC detects such a transition, control is transferred to the function implementing the other domain. The figure shows only two domains; the number of domains and mapping between domains can be as needed to achieve the desired user interface characteristics.

The particular sizes and equipment discussed above are cited merely to illustrate particular embodiments of the invention. It is contemplated that the use of the invention may involve components having different sizes and characteristics. It is intended that the scope of the invention be defined by the claims appended hereto.

I claim:

1. A method of providing a human-computer interface, comprising:
   a) providing an application domain corresponding to a multidimensional application;
   b) providing a personal domain corresponding to a personal interaction environment;
   c) selecting an active domain responsive to a user domain control input;
   d) when the application domain is the active domain, providing a display and user interaction corresponding to the application;
   e) when the personal domain is the active domain, providing a display and user interaction corresponding to the personal interaction environment distinct from those corresponding to the application, wherein the user interaction in the personal domain comprises control of the application domain and control of operations external to the application domain; and
   f) wherein selecting an active domain comprises detecting when the user causes a cursor to traverse a boundary between the domains, and wherein a boundary between the application domain and the personal domain is represented at one edge of the application domain and a corresponding edge of the personal domain, and wherein providing a display of a domain comprises, when said domain becomes the active domain, displacing the display of the previously active domain with the appearance to the user as though the user moved the view direction to said domain.

2. The method of claim 1, further comprising providing a second personal domain, and, when the second personal domain is the active domain, providing a display and user interaction corresponding to a second personal interaction environment.

3. A method of providing a human-computer interface, comprising:
   a) providing an application domain corresponding to a multidimensional application;
   b) providing a personal domain corresponding to a personal interaction environment;
   c) selecting an active domain responsive to a user domain control input, wherein selecting an active domain comprises detecting when the user causes a cursor to traverse a boundary between the domains;
   d) when the application domain is the active domain, providing a displav and user interaction corresponding to the application;
   e) when the personal domain is the active domain, providing a displav and user interaction corresponding to the personal interaction environment distinct from those corresponding to the application; and
   f) further comprising applying a force to a user input device, directed substantially in opposition to motion of the cursor toward the boundary.

4. A method of providing a human-computer interface, comprising:
   a) providing an application domain corresponding to a multidimensional application;
   b) providing a personal domain corresponding to a personal interaction environment;
   c) selecting an active domain responsive to a user domain control input, wherein selecting an active domain comprises detecting when the user causes a cursor to traverse a boundary between the domains;
   d) when the application domain is the active domain, providing a display and user interaction corresponding to the application;
   e) when the personal domain is the active domain, providing a display and user interaction corresponding to the personal interaction environment distinct from those corresponding to the application; and
   f) wherein the boundary is represented in the lower portion of the display corresponding to the application domain, and is represented in the upper portion of the display corresponding to the personal domain.

5. A method of providing a human-computer interface, comprising:
   a) providing an application domain corresponding to a multidimensional application;
   b) providing a personal domain corresponding to a personal interaction environment;
   c) selecting an active domain responsive to a user domain control input, wherein selecting an active domain comprises detecting when the user causes a cursor to traverse a boundary between the domains;

d) when the application domain is the active domain, providing a display and user interaction corresponding to the application;

e) when the personal domain is the active domain, providing a display and user interaction corresponding to the personal interaction environment distinct from those corresponding to the application; and f) wherein the user controls a cursor in at least first and second dimensions corresponding to a display plane and a third dimension of depth substantially orthogonal to the first and second dimensions, and wherein selecting an active domain comprises detecting a change in cursor depth.

6. A method of providing a human-computer interface, comprising:

a) providing an application domain corresponding to a multidimensional application;

b) providing a personal domain corresponding to a personal interaction environment;

c) selecting an active domain responsive to a user domain control input, wherein selecting an active domain comprises detecting when the user causes a cursor to traverse a boundary between the domains;

d) when the application domain is the active domain, providing a display and user interaction corresponding to the application;

e) when the personal domain is the active domain, providing a display and user interaction corresponding to the personal interaction environment distinct from those corresponding to the application; and f) wherein the boundary corresponds to a portion of the application domain nearest the user when the application domain is the active domain, and corresponds to a portion of the personal domain farthest from the user when the personal domain is the active domain.

7. The method of claim 6, further comprising applying a force to a user input device, directed substantially in opposition to motion of the cursor toward the boundary.

8. A method of providing a human-computer interface, comprising:

a) providing an application domain corresponding to a multidimensional applications b) providing a personal domain corresponding to a personal interaction environment;

c) selecting an active domain responsive to a user domain control input;

d) when the application domain is the active domain, providing a display and user interaction corresponding to the application;

e) when the personal domain is the active domain, providing a display and user interaction corresponding to the personal interaction environment distinct from those corresponding to the application; and f) wherein user interaction in the personal domain comprises providing a second personal domain and selecting an active personal domain from personal domain control input from the user, and wherein the second personal domain is not directly accessible from the application domain.

9. The method of claim 8, wherein the application domain comprises a space navigable in multiple dimensions.

10. The method of claim 8, wherein selecting an active personal domain comprises detecting when the user causes a cursor to traverse a boundary between the two personal domains, and further comprising applying a force to a user input device, directed substantially in opposition to motion of the cursor toward the boundary.

11. A method of providing a human-computer interface, comprising:

a) providing an application domain corresponding to a multidimensional application;

b) providing a personal domain corresponding to a personal interaction environment;

c) selecting an active domain responsive to a user domain control input;

d) when the application domain is the active domain, providing a display and user interaction corresponding to the application;

e) when the personal domain is the active domain, providing a display and user interaction corresponding to the personal interaction environment distinct from those corresponding to the application;

f) wherein the application domain comprises a navigable three-dimensional space, and wherein the user domain control input is substantially independent of navigation in the application domain; and g) wherein the user domain control input comprises the user causing a cursor to traverse a boundary between the application and personal domains, and further comprising applying a force to a user input device, directed substantially in opposition to motion of the cursor toward the boundary.

12. The method of claim 11, wherein the user controls a cursor in at least first and second dimensions corresponding to a display plane and a third dimension of depth substantially orthogonal to the first and second dimensions, and wherein traversing the boundary comprises changing the depth of the cursor.

13. The method of claim 12, wherein the personal domain comprises a two-dimensional space, and wherein the application domain comprises a three-dimensional space.

14. The method of claim 12, wherein the personal domain comprises a three-dimensional space, and wherein the application domain comprises a three-dimensional space.

15. The method of claim 12, wherein the boundary corresponds to a portion of the application domain nearest the user when the application domain is the active domain, and corresponds to a portion of the personal domain farthest from the user when the personal domain is the active domain.

16. A method of providing an interface between a user and a computer comprising:

a) providing an application domain, corresponding to an application space navigable in three dimensions;

b) providing first and second personal domains, corresponding respectively to first and second personal interface environments;

c) designating one of the domains as the active domain and interacting with user according to:

i) when the application domain is the active domain, providing a display corresponding to the application space, providing interaction with the user corresponding to the application interface characteristics, and detecting a first indication from the user to designate the first personal domain as the active domain;

ii) when the first personal domain is the active domain, providing a display corresponding to the first interaction environment, providing interaction with the user according to the first interaction environment, detecting a second indication from the user to designate the application domain as the active domain, and detecting a third indication from the user designating the second personal domain as the active domain;

iii) when the second personal domain is the active domain, providing a display corresponding to the second interaction environment, providing interaction with the user according to the second interaction environment, and detecting a fourth indication from the user to designate the first personal domain as the active domain.

17. The method of claim 16, wherein the first indication comprises motion of a cursor across a boundary from the application domain to the first personal domain, and wherein the second indication comprises motion of a cursor across a boundary from the first personal domain to the application domain.

18. The method of claim 17, further comprising applying a force to a user cursor control device directed substantially away from a boundary when the cursor approaches said boundary.

19. The method of claim 18, wherein the third indication comprises motion of a cursor across a boundary from the first persona domain to the second personal domain, said boundary comprising a portion of the first personal domain near an edge thereof, and wherein the fourth indication comprises motion of a cursor across a boundary from the second personal domain to the first personal domain, said boundary comprising a portion of thne second personal domain near an edge thereof.

20. The method of claim 19, further comprising applying a force to a user cursor control device directed substantially away from a boundary when the cursor approaches said boundary.

21. The method of claim 16, wherein the third indication comprises motion of a cursor across a boundary from the first personal domain to the second personal domain, and wherein the fourth indication comprises motion of a cursor across a boundary from the second personal domain to the first personal domain.

22. The method of claim 17, wherein the boundary from the application domain to the first personal domain comprises a portion of thxe application domain mapped near the user.

23. The method of claim 16, further comprising providing a second application domain corresponding to a second application space navigable in three dimensions, and when the second application domain is the active domain providing a display corresponding to the second application space, providing interaction with the user corresponding to the second application interface characteristics, and detecting a fifth indication from the user to designate the first personal domain as the active domain, and when the first personal domain is the active domain detecting a sixth indication from the user to designate the second application domain as the active domain.

24. The method of claim 16, further comprising providing force feedback to the user communicating changes in the active domain.

25. A computer interface system, allowing a user to interface with an application domain and a personal domain, comprising:

a) an application domain function (ADF), displaying the application domain when the application domain is the active domain;

b) an personal domain function (PDF), displaving the personal domain when the personal domain is the active domain; and c) an active domain controller (ADC), responsive to input from the user indicating control designating as the active domain either the application domain or the personal domain; and d) wherein the ADC selects the active domain according to motion of a user input device moveable over a range of motion bounded by first and second extremes thereof, where:

i) when the application domain is the active domain, then movement of the input device to a region near the first extreme of its range of motion causes the personal domain to become the active domain;

ii) when the personal domain is the active domain, then movement of the input device near the second extreme of its range of motion causes the application domain to become the active domain.

26. A computer interface system, allowing a user to interface with an application domain and a personal domain, comprising:

a) an application domain function (ADF), displaying the application domain when the application domain is the active domain;

b) an personal domain function (PDF), displaving the personal domain when the personal domain is the active domain; and c) an active domain controller (ADC), responsive to input from the user indicating control designating as the active domain either the apDlication domain or the personal domain; and d) wherein the input from the user required to designate the active domain comprises moving a cursor across a boundary between domains, and wherein, upon designation of the personal domain as the active domain, the PDF moves the application domain substantially off the visible portion of the display and moves the personal domain in its place, providing the illusion that the user has turned the head from the application domain to the personal domain following substantially the direction of the input device across the boundary.

27. A computer interface system, allowing a user to interface with an application domain and a personal domain, comprising:

a) an application domain function (ADF), displaying the application domain when the application domain is the active domain;

b) an personal domain function (PDF), displaving the personal domain when the personal domain is the active domain; and c) an active domain controller (ADC), responsive to input from the user indicating control designating as the active domain either the application domain or the personal domain; and d) wherein the input from the user required to designate the active domain comprises moving a cursor across a boundary between domains, and wherein, upon designation of the personal domain as the active domain, the PDF moves the application domain substantially off the visible portion of the display and moves the personal domain in its place, providing the illusion that the user has turned the head from the application domain to the personal domain following substantially opposite the direction of the input device across the boundary.

28. A computer interface system, allowing a user to interface with an application domain and a personal domain, comprising:

a) an application domain function (ADF), displaying the application domain when the application domain is the active domain;

b) an personal domain function (PDF), displaying the personal domain when the personal domain is the active domain; and c) an active domain controller (ADC), responsive to input from the user indicating control designating as the active domain either the application domain or the personal domain; and d) wherein the PDF displays a representation of the application domain with the personal domain superimposed thereon, providing the impression that the application domain is behind the personal domain in the display.

29. A computer interface system, allowing a user to interface with an application domain and a personal domain, comprising:

a) an application domain function (ADF), displaying the application domain when the application domain is the active domain;

b) an personal domain function (PDF), displaying the personal domain when the personal domain is the active domain; and c) an active domain controller (ADC), responsive to input from the user indicating control designating as the active domain either the application domain or the personal domain; and d) wherein the personal domain comprises a first personal domain and a second personal domain, wherein the input from the user required to designate the active domain comprises moving a cursor across a boundary between domains, and wherein the ADF displays a boundary to the first personal domain near the bottom of the display of the application domain, and where the ADF displays a boundary to the second personal domain near a side of the display of the application domain.

30. A method of providing a human-computer interface, comprising:

a) providing an application domain corresponding to a multidimensional application;

b) providing a personal domain corresponding to a personal interaction environment;

c) selecting an active domain responsive to a user domain control input, and communicating changes in the active domain by providing force feedback to the user;

d) when the application domain is the active domain, providing a disDlay and user interaction corresponding to the application;

e) when the personal domain is the active domain, providing a display and user interaction corresponding to the personal interaction environment distinct from those corresponding to the application;

f) wherein selecting an active domain comprises detecting when the user causes a cursor to traverse a boundary between the domains; and g) wherein providing force feedback comprises applying a force to a user input device, directed substantially in opposition to motion of the cursor toward the boundary.

31. A method of providing a human-computer interface, comprising:

a) providing an application domain corresponding to a multidimensional application;

b) providing a personal domain corresponding to a personal interaction environment;

c) selecting an active domain responsive to a user domain control input, and communicating changes in the active domain by providing force feedback to the user;

d) when the application domain is the active domain, providing a display and user interaction corresponding to the application;

e) when the personal domain is the active domain, providing a display and user interaction corresponding to the personal interaction environment distinct from those corresponding to the application;

f) wherein selecting an active domain comprises detecting when the user causes a cursor to traverse a boundary between the domains; and g) wherein the user controls a cursor in at least first and second dimensions corresponding to a display plane and a third dimension of depth substantially orthogonal to the first and second dimensions, and wherein selecting an active domain comprises detecting a change in cursor depth.

* * * * *